(12) United States Patent
Suzuki

(10) Patent No.: US 10,397,587 B2
(45) Date of Patent: Aug. 27, 2019

(54) IMAGE PROCESSING APPARATUS AND CONTROL METHOD THEREOF

(71) Applicant: CANON KABUSHIKI KAISHA, Tokyo (JP)

(72) Inventor: Ryota Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 15/494,061

(22) Filed: Apr. 21, 2017

(65) Prior Publication Data

US 2017/0318300 A1    Nov. 2, 2017

(30) Foreign Application Priority Data

May 2, 2016    (JP) .................................. 2016-092801

(51) Int. Cl.
*H04N 19/85* (2014.01)
*H04N 19/182* (2014.01)
*H04N 19/186* (2014.01)

(52) U.S. Cl.
CPC ......... *H04N 19/186* (2014.11); *H04N 19/182* (2014.11); *H04N 19/85* (2014.11)

(58) Field of Classification Search
CPC ..... H04N 19/186; H04N 19/85; H04N 19/182
See application file for complete search history.

(56) References Cited

U.S. PATENT DOCUMENTS

| | | | | |
|---|---|---|---|---|
| 2002/0191854 A1* | 12/2002 | Kakarala | ............... | G06T 3/4015 382/240 |
| 2014/0078338 A1* | 3/2014 | Hatano | .................. | H04N 9/045 348/222.1 |
| 2014/0085498 A1* | 3/2014 | Hatano | .................... | H04N 9/07 348/221.1 |
| 2015/0098499 A1* | 4/2015 | Tominaga | .......... | H04N 5/23229 375/240.02 |
| 2016/0269733 A1* | 9/2016 | Tourapis | ............... | H04N 19/189 |

FOREIGN PATENT DOCUMENTS

JP    2003-346143    12/2003

* cited by examiner

*Primary Examiner* — Wesley J Tucker
(74) *Attorney, Agent, or Firm* — Venable LLP

(57) ABSTRACT

Image data of a format in which pixel data having a value of one color component among a predetermined plurality of color components is regularly arranged is converted to a data format in which each item of pixel data has values of the plurality of color components. After performing resizing processing on this image data, the image data is returned to the original data format. Thus, it is possible to perform resizing with a magnification ratio that is not limited to one divided by an integer.

18 Claims, 7 Drawing Sheets

IMAGE PROCESSING APPARATUS AND CONTROL METHOD THEREOF

BACKGROUND OF THE INVENTION

Field of the Invention

The present invention relates to an image processing apparatus and a control method thereof.

Description of the Related Art

In an image capture apparatus such as a digital camera, development processing (white balance adjustment, color interpolation (demosaicing), noise removal correction, gradation and color correction, sharpness correction, or the like) is performed on image data that can be obtained from an image sensor, and color image data is generated. Image data before development processing is commonly called RAW data. The image capture apparatus compresses and encodes this color image data by an encoding scheme such as JPEG, and records this data to a recording medium.

Recently, there also exist image capture apparatuses that have a function to record image data before JPEG encoding has been applied. With this sort of image capture apparatus, for example, RAW data before development processing can be recorded (stored to a recording medium). RAW data can be recorded not only for a still image, but also for a moving image.

When recording RAW data having a different number of pixels than image data that was obtained by an image sensor, it is necessary to change the number of pixels of RAW data. Processing to change the number of pixels of image data is also called resizing processing. An example of resizing processing to change the number of pixels of RAW data is disclosed in Japanese Patent Laid-Open No. 2003-346143. In Japanese Patent Laid-Open No. 2003-346143, a reduced image is generated by pixel thinning, and a display image is generated from the reduced image.

However, in Japanese Patent Laid-Open No. 2003-346143, because a configuration to perform pixel thinning is adopted, the magnification ratio of resizing is limited to 1/N (N being an integer). Also, in Japanese Patent Laid-Open No. 2003-346143, a reduced image is generated by thinning pixels of RAW data in which data of each pixel has information of only any one color component among R, G, and B components. Also, because demosaicing processing is performed on this reduced image to generate a display image, there is also the problem that pseudo color, moire, or the like occur.

SUMMARY OF THE INVENTION

The present invention was made in consideration of such problems in the conventional technology. One aspect the present invention provides an image processing apparatus and control method thereof capable of changing the number of pixels of image data, which has a format in which pixel data having a value of one color component among a predetermined plurality of color components has been arranged according to a predetermined pixel arrangement, using a magnification ratio that is not limited to one divided by an integer.

According to an aspect of the present invention, there is provided an image processing apparatus, comprising: an obtaining unit configured to obtain image data of a first data format, wherein the image data of the first data format comprises a plurality of pixel data each having a value of a single color component among a predetermined plurality of color components, and wherein the plurality of pixel data in the image data of the first data format being arranged according to a predetermined pixel arrangement; a first conversion unit configured to convert the image data of the first data format that was obtained by the obtaining unit to a second data format, and output the image data of the second data format, wherein the image data of the second data format comprises a plurality of pixel data each having values of the plurality of color components; a resizing unit configured to reduce the number of pixel data of the image data of the second data format that was output from the first conversion unit, and output reduced image data of the second data format; and a second conversion unit configured to convert the reduced image data of the second format to the first data format, and output the converted image data as the reduced image data of the first data format.

According to another aspect of the present invention, there is provided an image processing apparatus comprising: an imaging unit configured to obtain image data of a first data format, wherein the image data of the first data format comprises a plurality of pixel data each having a value of a single color component among a predetermined plurality of color components, and wherein the plurality of pixel data in the image data of the first data format being arranged according to a predetermined pixel arrangement; a first conversion unit configured to perform demosaicing processing on the image data of the first data format that was obtained by the imaging unit, and output image data of a second data format, wherein in the image data of the second data format comprises a plurality of pixel data each having values of the plurality of color components; a resizing unit configured to perform resizing processing to reduce the number of pixels of the image data of the second data format that was output from the first conversion unit, and output reduced image data of the second data format, the resizing unit performing the resizing processing with a magnification ratio of N1/M1 (where N1 and M1 each are natural numbers, and N1<M1) in the horizontal direction, and N2/M2 (where N2 and M2 each are natural numbers, and N2<M2) in the vertical direction, and M1 is not an integer multiple of N1, or M2 is not an integer multiple of N2; a second conversion unit configured to perform mosaicing processing on the reduced image data of the second format that was output from the resizing unit, and output reduced image data of the first data format; a recording unit configured to record the reduced image data of the first data format that was output from the second conversion unit; and a control unit configured to perform control such that the demosaicing processing by the first conversion unit, the resizing processing by the resizing unit, and the mosaicing processing by the second conversion unit are automatically executed as a series of processes according to a recording instruction by a user.

According to a further aspect of the present invention, there is provided a control method of an image processing apparatus, comprising: obtaining image data of a first data format, wherein the image data comprises a plurality of pixel data each having a value of a single color component among a predetermined plurality of color components, and wherein the plurality of pixel data are arranged according to a predetermined pixel arrangement; performing first conversion of obtaining image data of the second data format by converting the image data of the first data format that was obtained in the obtaining to a second data format, wherein the image data of the second format comprises a plurality of pixel data each having values of the plurality of color components; resizing of the image data of the second format by reducing a number of pixels of the image data of the second data format that was obtained in the first conversion to obtain reduced image data of the second data format; and performing second conversion of converting the reduced image data of the second format that was obtained in the resizing to the first data format, and obtaining reduced image data of the first data format.

According to another aspect of the present invention, there is provided a non-transitory computer-readable medium containing a program that causes at least one processor of an image processing apparatus to function as: an obtaining unit configured to obtain image data of a first data format, wherein the image data of the first data format comprises a plurality of pixel data each having a value of a single color component among a predetermined plurality of color components, and wherein the plurality of pixel data in the image data of the first data format being arranged according to a predetermined pixel arrangement; a first conversion unit configured to convert the image data of the first data format that was obtained by the obtaining unit to a second data format, and output the image data of the second data format, wherein the image data of the second data format comprises a plurality of pixel data each having values of the plurality of color components; a resizing unit configured to reduce the number of pixel data of the image data of the second data format that was output from the first conversion unit, and output reduced image data of the second data format; and a second conversion unit configured to convert the reduced image data of the second format to the first data format, and output the converted image data as the reduced image data of the first data format.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that below, a digital video camera is described as one example of an image processing apparatus according to the present invention. However, the present invention can be implemented in any electronic device capable of obtaining data before color interpolation (demosaicing) processing (RAW data). Such electronic devices include electronic devices having a built-in digital camera or capable of connection to a digital camera, as well as electronic devices capable of obtaining recorded RAW data through a recording medium or a network. For example, the electronic device may be a computer (such as a desktop-type computer, a notebook-type computer, a tablet-type computer, or a wearable-type computer), a game console, a mobile telephone, a television, a video recorder, a set-top box, a printer, a copier, or the like.

First Embodiment

Figure 1A:
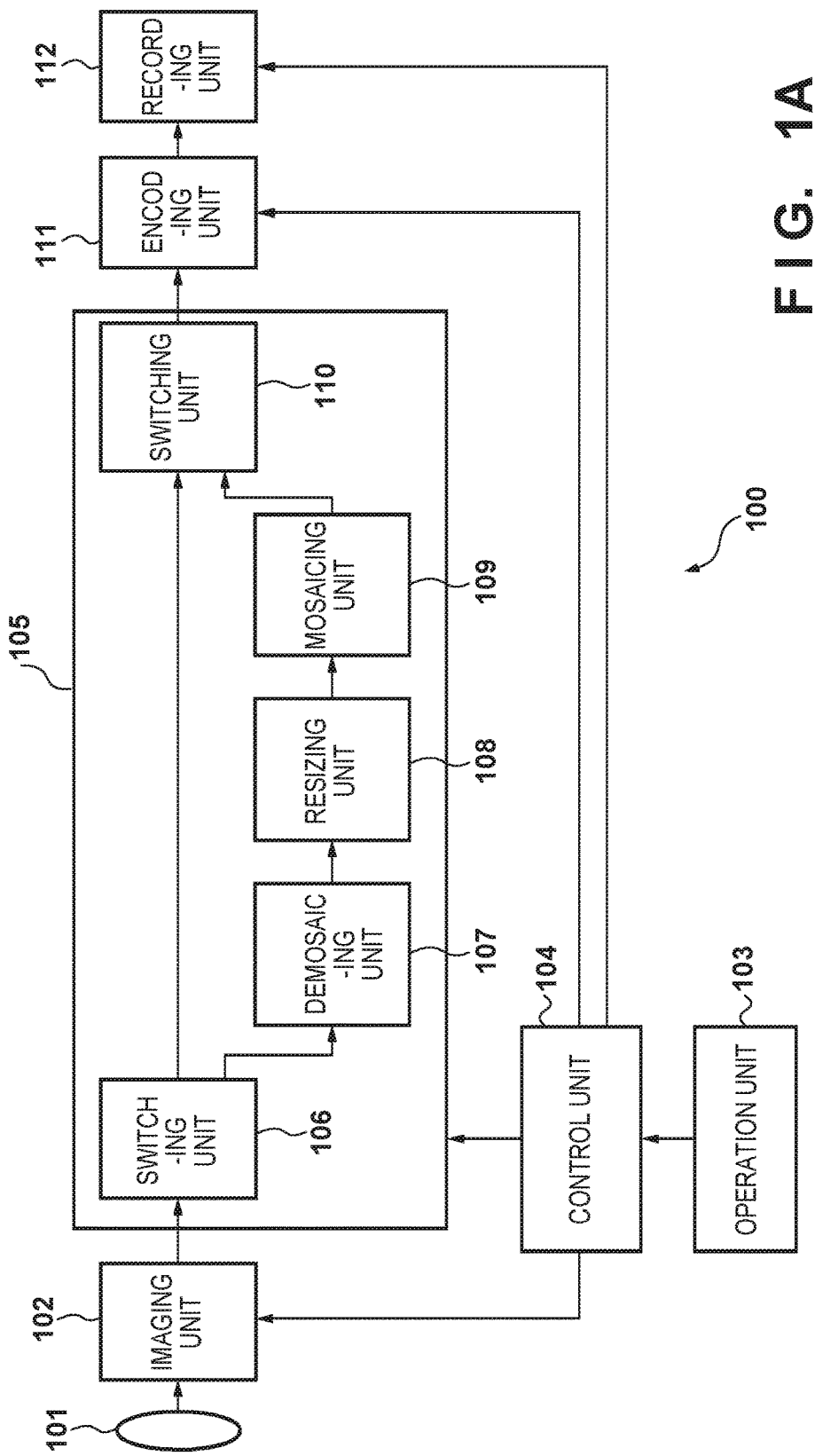
FIGS. 1A and 1B are block diagrams showing an exemplary configuration of an image processing apparatus according to a first embodiment.

FIG. 1A is a block diagram showing an exemplary functional configuration of a digital video camera (DVC) 100 serving as an image processing apparatus according to a first embodiment of the present invention. The DVC 100 has a function to change the number of pixels (perform resizing) of RAW data according to a recording mode and record the data. Accordingly, the DVC 100 can record RAW data having the number of pixels different than the number of pixels of an image sensor.

An imaging lens 101 has a focus lens, a variable magnification lens, an aperture, and the like, and forms an optical image of a subject on an imaging plane of an imaging unit 102.

The imaging unit 102 has an image sensor in which a plurality of pixels having a photoelectric conversion function are arranged in a matrix, for example. The image sensor converts an optical image of a subject into a pixel signal group (RAW data). The image sensor may be, for example, a single-plane type CCD or a CMOS color image sensor. Each pixel of the image sensor is provided with a filter of a predetermined color, and each pixel outputs a pixel signal according to the intensity of transmitted light of the filter. In the present embodiment, it is assumed that the color of the filter provided in a pixel is any among red (R), green (G), and blue (B), and filter colors are arranged according to a Bayer pattern. The Bayer pattern is a regular pattern with a 2×2 group of 4 pixels as a repeating unit, and in the repeating unit, red and blue pixels are diagonally opposite and two green pixels are diagonally arranged. Note that the colors and arrangement of the filters provided in pixels are not limited to those described as an example here.

In the present embodiment, it is assumed that the number of pixels of the image sensor of the imaging unit 102 is 6K pixels (5760 pixels horizontally×3840 pixels vertically). Also, in the DVC 100, a still image recording mode and a moving image recording mode are selectable, and the number of pixels of a still image recordable in the still image recording mode is 6K. Also, it is assumed that the number of pixels of one frame of moving image data recordable in the moving image recording mode is 4K (3840 pixels horizontally×2160 pixels vertically). Also, the frame rate of moving image data recordable in the moving image recording mode is 60 frames per second.

Note that it is also possible to adopt a configuration in which the number of pixels of the image sensor of the imaging unit 102 is 6K or more. For example, it is possible to adopt a configuration in which the number of pixels of the image sensor is 8K. Likewise, it is also possible to adopt a configuration in which the number of pixels of a still image recordable in the still image recording mode is 6K or more. Also, it is possible to adopt a configuration in which the frame rate of the moving image data output by the image sensor is 60 frames per second or more.

The RAW data output by the imaging unit 102 is a first data format in which a plurality of items of pixel data, each having a value of one color component among a predetermined plurality of color components, have been regularly arranged according to a predetermined pixel arrangement. Note that the RAW data output by the imaging unit 102 may be analog data or digital data.

An operation unit 103 has input devices that can be operated by a user, such as switches, buttons, and a touch panel. User operation to the operation unit 103 is notified to a control unit 104. Note that the input device of the operation unit 103 is not limited to a device that requires physical operation, and an input device employing input using voice, line of sight, or the like may also be used. Through the operation unit 103, the user can switch the recording mode of the DVC 100, change the size (resolution) of the image to be recorded, instruct starting, pausing, or ending of recording, or the like.

A control unit 104 includes at least one programmable processor such as a CPU, a nonvolatile memory, and a volatile memory. The control unit 104 controls the overall operation of the DVC 100 by reading a program that has been stored in the nonvolatile memory into the volatile memory and executing the program with the programmable processor. For example, the control unit 104 controls operation of an image processing unit 105 according to the recording mode that has been set, and realizes resizing processing for RAW data, described later.

Figure 1B:
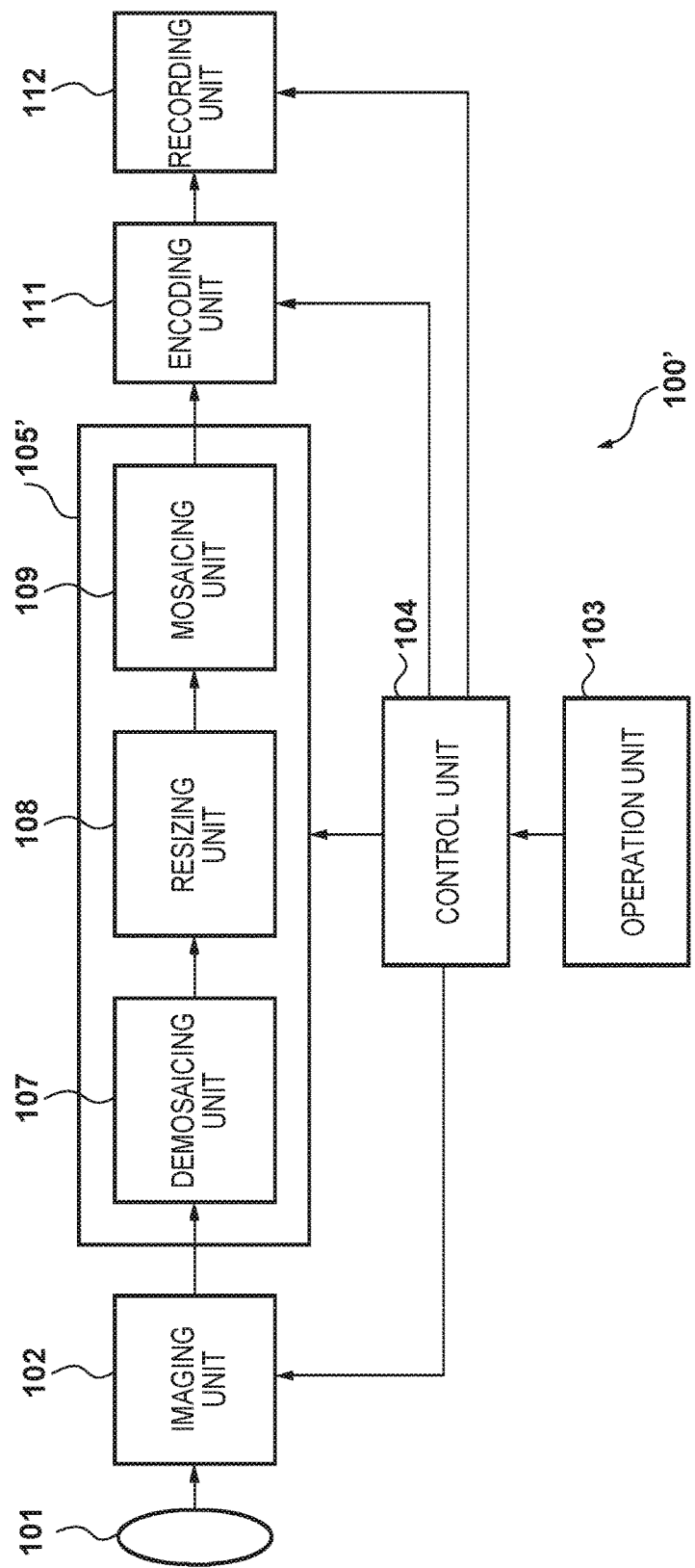

The image processing unit 105 applies various processing to the raw data output by the imaging unit 102 according to control of the control unit 104. This processing includes at least one type of processing constituting so-called development processing, such as white balance adjustment, color interpolation (demosaicing), noise removal correction, gradation and color correction, or sharpness correction. Also, at least one of A/D conversion, resizing, detection and recognition of a subject (for example, a human face), optical aberration correction, color conversion, application of a visual effect, generating information for automatic exposure control (for example, luminance information), generation of an evaluation value or a signal for autofocus, or the like can be performed with the image processing unit 105. Note that the processing described here is an example, and other processing may be performed. FIGS. 1A and 1B use schematic function blocks to illustrate the operation of the image processing unit 105 when executing, among the various processes described above, the resizing processing in the present embodiment.

Note that although the image processing unit 105 can be realized by dedicated hardware such as an ASIC, at least some of the processing of the image processing unit 105 can also be realized by a programmable processor executing a program.

A switching unit 106 outputs the RAW data to be input to a demosaicing unit 107 or a switching unit 110. The output destination of the switching unit 106 is controlled by the control unit 104.

Specifically, the control unit 104 switches the output destination of the switching unit 106 to the demosaicing unit 107 when performing resizing processing on the RAW data, and switches the output destination of the switching unit 106 to the switching unit 110 when not performing resizing processing.

The demosaicing unit 107 performs demosaicing processing (color interpolation processing) on the RAW data. In the demosaicing processing, the first data format, in which pixel data having a value of one color component among a predetermined plurality of color components (for example, RGB) has been arranged in a regular manner, is converted to a second data format, in which each item of pixel data has a value of a plurality of color components (RGB). For example, in data of a pixel (an R pixel) provided with a red filter, a green component and a blue component are insufficient. Therefore, the demosaicing unit 107, among neighboring pixels, generates the green component from data of a pixel (a G pixel) provided with a green filter, and generates the blue component from data of a pixel (a B pixel) provided with a blue filter.

Figure 2:
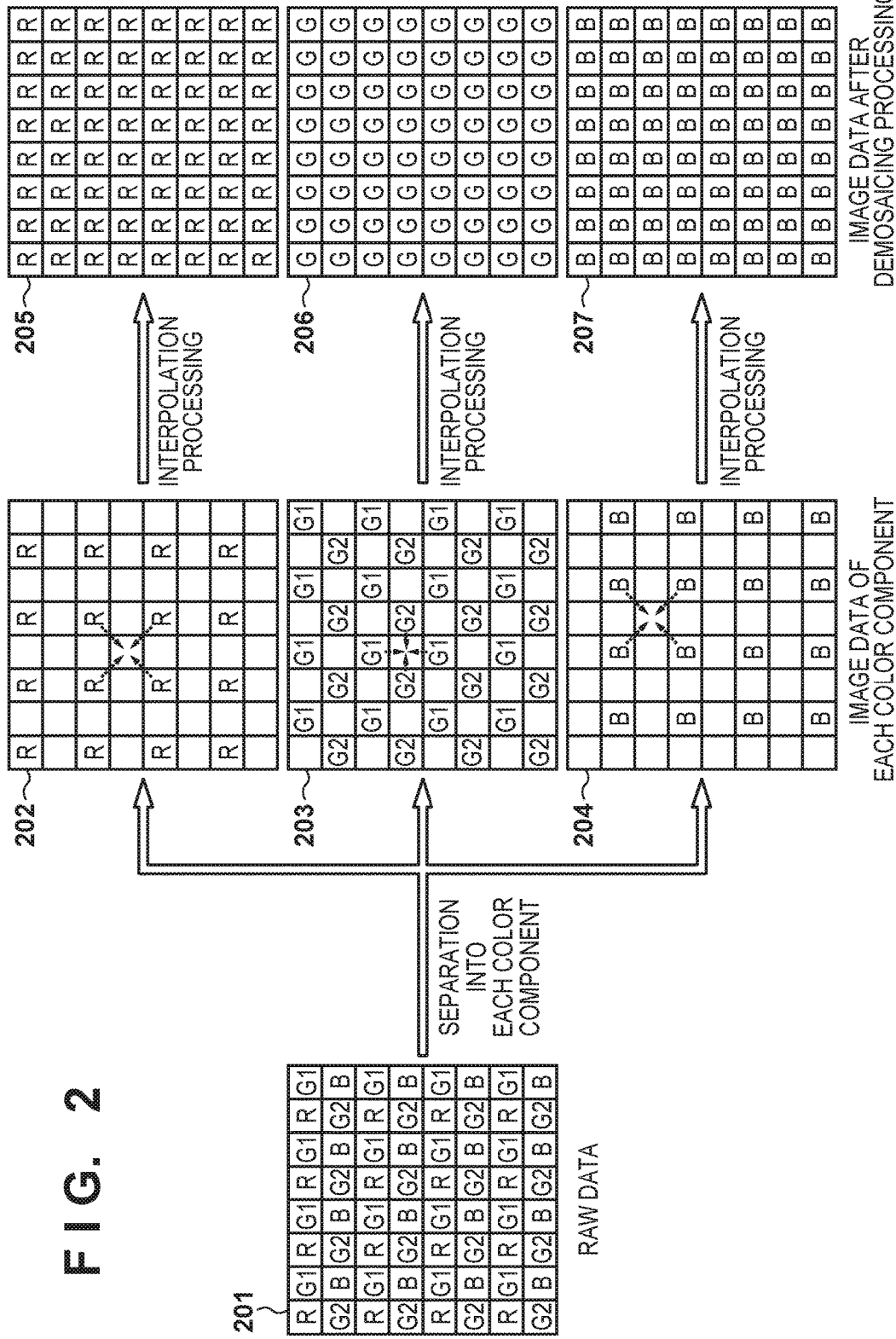
FIG. 2 relates to demosaicing processing of the image processing apparatus according to the first embodiment.

Here, an example of the demosaicing processing will be described with reference to FIG. 2. Reference numeral 201 denotes the RAW data, and reference numerals 202, 203, and 204 respectively denote R pixel data, G pixel data, and B pixel data that constitute the RAW data. The data of each pixel constituting the RAW data 201 includes, among color components (for example, R, G, B) necessary in order to express full color or true color, only the value of one color component corresponding to the color of the filter provided in the pixel.

That is, as shown as the R pixel data 202, the G pixel data 203, and the B pixel data 204, the RAW data is data in which the pixels of each color component have been subsampled. When resizing is performed by thinning the pixel data in the state of RAW data, the number of pixels per color component is further reduced. Therefore, after resizing, the difference in values between nearby pixel data of the same color in the vicinity has a tendency to become large, and as a result, pseudo color or moire are likely to occur.

In the present embodiment, demosaicing processing is performed before resizing processing in order to suppress this sort of image quality degradation. Reference numerals 205 to 207 denote R pixel data, G pixel data, and B pixel data after demosaicing processing. In this way, by demosaicing processing, the RAW data is converted into color image data in which each pixel includes R, G, and B components. Note that in the present embodiment, as shown in FIG. 2, for example regarding a pixel position where a value of a certain color component does not exist, the values of color components are generated by interpolation calculation using the values of four surrounding pixels of the same color. Note that another well-known arbitrary method can be used for demosaicing processing. The demosaicing unit 107 outputs the color image data generated by demosaicing processing to a resizing unit 108.

The resizing unit 108 changes (in this case, reduces) the size (the number of pixels) of the color image data after demosaicing processing based on a magnification ratio inputted from the control unit 104, and outputs the color image data whose size has been changed (reduced) to a mosaicing unit 109. The magnification ratio is an example of information indicating a change amount (reduction amount) of the number of pixels, and other information may also be used. The magnification ratio of the resizing processing to be executed by the resizing unit 108 is not limited to one divided by an integer. Such resizing processing can be implemented by a well-known arbitrary method. That is, the resizing unit 108 is provided with a filter for generating an interpolation pixel. Pixels and filter coefficients used for filter processing are appropriately changed according to the specified magnification ratio, and pixel data corresponding to the number of pixels after change is generated. In the present embodiment, because the image data to be subjected to resizing processing is full color data, it is easy to implement resizing processing at an arbitrary magnification ratio, and in addition, regarding individual pixels constituting the image after resizing, it is possible to accurately obtain values for all color components.

The mosaicing unit 109 performs mosaicing processing to convert the resized color image data inputted from the resizing unit 108 to a RAW data format (a mosaic format in which pixels having a value of one color component are regularly arranged). Then, the mosaicing unit 109 outputs the data subjected to the mosaicing processing to the switching unit 110 as resized RAW data. The mosaicing processing is inverse processing of the demosaicing processing, and converts image data (full color data) having the second data format into image data (RAW data) having the first data format. Accordingly, the demosaicing processing may be processing of, for example, removing two color components regarding each pixel position such that in the data after processing, pixels of each color component have the same arrangement as the RAW data. For example, the color image after resizing, when separated into each color component, has a similar format as the R pixel data 205, the G pixel data 206, and the B pixel data 207 in FIG. 2. The processing to convert the R pixel data 205, the G pixel data 206, and the B pixel data 207 into the R pixel data 202, the G pixel data 203, and the B pixel data 204 is mosaicing processing. In other words, by thinning data from the resized R pixel data 205 other than pixels at positions corresponding to the Bayer pattern, the resized R pixel data 202 of the RAW data is generated. Likewise, by thinning data from the resized G pixel data 206 and the B pixel data 207 other than pixels at positions corresponding to the Bayer pattern, the resized G pixel data 203 and B pixel data 204 of the RAW data is generated.

The switching unit 110 outputs one among the RAW data from the switching unit 106 and the RAW data from the mosaicing unit 109 to an encoding unit 111. The control unit 104 controls which RAW data is output by the switching unit 110. Specifically, the control unit 104 controls operation of the switching unit 110 such that RAW data is output from the mosaicing unit 109 to the encoding unit 111 when performing resizing processing on the RAW data, and RAW data is output from the switching unit 106 to the encoding unit 111 when resizing processing is not performed.

Note that the control unit 104 may stop operation of the demosaicing unit 107, the resizing unit 108, and the mosaicing unit 109 when resizing processing is not performed on the RAW data. On the other hand, when performing resizing processing on the RAW data, the control unit 104 causes the demosaicing unit 107, the resizing unit 108, and the mosaicing unit 109 to operate according to an instruction to start recording a still image or a moving image, as described later.

The encoding unit 111 encodes the RAW data inputted from the switching unit 110 with a predetermined scheme, thereby generating encoded RAW data in which the amount of information has been compressed. The encoding unit 111 outputs the encoded RAW data to a recording unit 112. The recording unit 112 records the encoded RAW data outputted from the encoding unit 111 to a recording medium in a predetermined file format.

Figure 3:
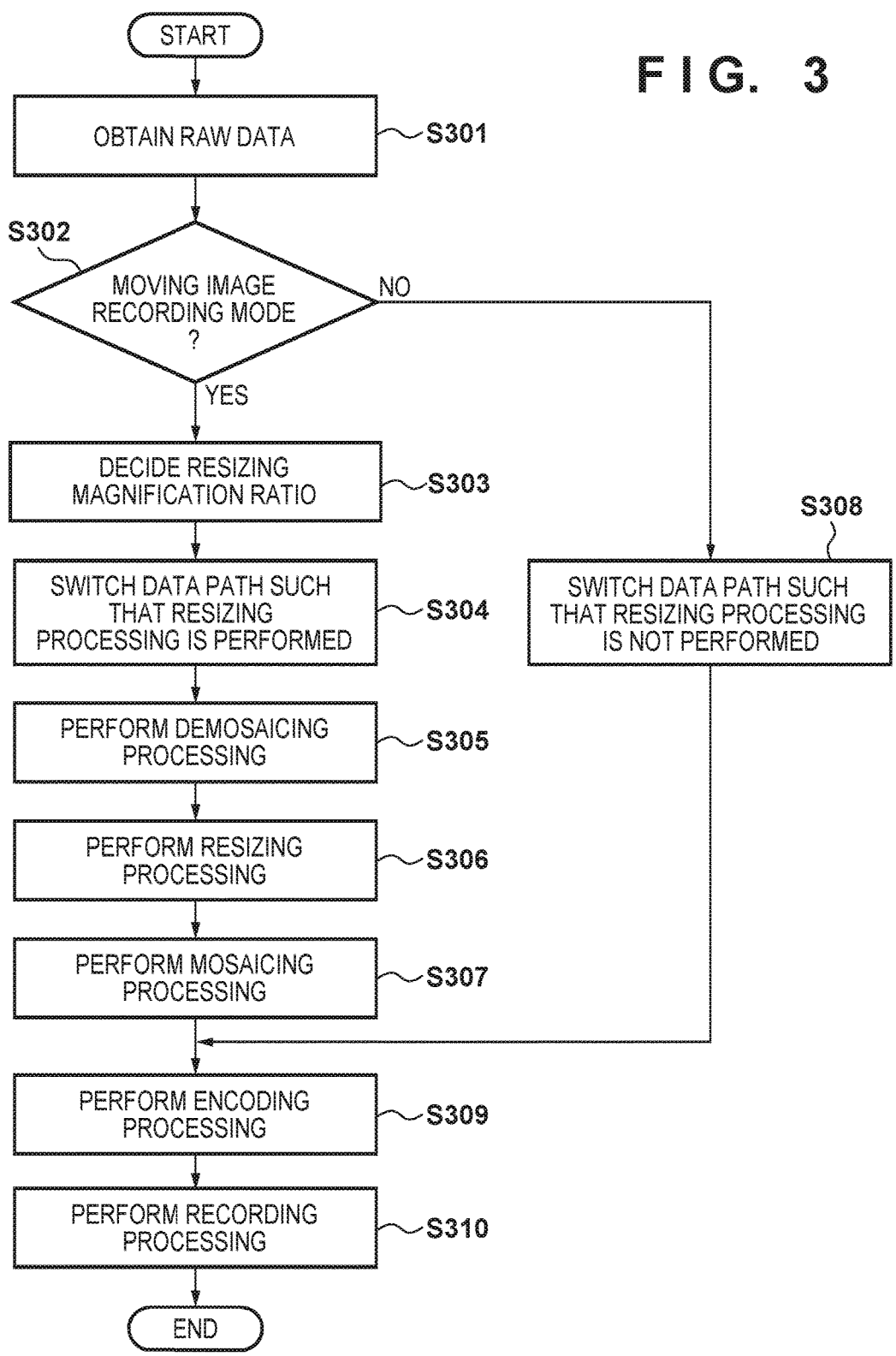
FIG. 3 is a flowchart related to recording processing of the image processing apparatus according to the first embodiment.

FIG. 3 is a flowchart related to operation of processing to record RAW data according to the DVC 100.

The control unit 104 starts recording processing when detecting that a still image recording instruction or a moving image recording start instruction has been input through the operation unit 103. Decision of shooting conditions such as aperture or shutter speed, and focus point adjustment of the imaging lens 101, are assumed to be implemented by a well-known method.

First, in step S301, the control unit 104 controls the imaging unit 102, executes a shooting operation according to the recording mode, and obtains still image RAW data or moving image RAW data. For example, in a case where the still image recording mode has been set, the control unit 104 controls the imaging unit 102 to output the still image RAW data of one frame according to a still image recording instruction. In a case where the moving image recording mode has been set, the control unit 104 controls the imaging unit 102 to output moving image RAW data of 60 frames per second according to a moving image recording start instruction. Note that in the moving image RAW data, each frame may be composed of still image RAW data.

Note that obtaining the RAW data in step S301 does not require shooting by the imaging unit 102. For example, the control unit 104 may read out the RAW data from a recording medium through the recording unit 112, or may receive the RAW data from an external device.

In step S302, the control unit 104 determines whether or not to perform resizing processing. Specifically, the control unit 104 determines whether or not the moving image recording mode has been set, and if the moving image recording mode has been set, the control unit 104 advances processing to step S303, and if the moving image recording mode has not been set (the still image recording mode has been set), the control unit 104 advances processing to step S308. Note that here, resizing processing is applied when in the moving image recording mode, and resizing processing is not applied when in the still image recording mode, so the recording mode is determined in step S302. However, whether or not to apply resizing processing may also be decided according to other conditions. For example, a configuration can be adopted in which, regardless of the recording mode, the control unit 104 does not apply resizing processing if the shooting size (the number of pixels in the horizontal direction and the vertical direction) is the same as the recording size that has been set, and the control unit 104 applies resizing processing if the shooting size is different than the recording size that has been set.

In step S303, the control unit 104 decides a resizing magnification ratio. Basically, it is sufficient to decide the resizing magnification ratio based on the size (shooting size) of the image output from the imaging unit 102 and the size (recording size) of the image to be recorded by the recording unit 112. As described above, in the present embodiment, the shooting size is equal to the number of pixels of the image sensor, which is 6K (5760×3840 pixels), and the recording size of the moving image is 4K (3840×2160 pixels). Therefore, the control unit 104 decides the magnification ratio of resizing processing in each direction as follows.

Horizontal direction magnification ratio: 3840/5760=2/3

Vertical direction magnification ratio: 2160/3840=9/16

The control unit 104 sets the decided resizing magnification ratio (horizontal direction, vertical direction) in the resizing unit 108.

In step S304, the control unit 104 switches a data path of the image processing unit 105 such that resizing processing is applied to RAW data. That is, the control unit 104 controls the switching unit 106 to output RAW data from the imaging unit 102 to the demosaicing unit 107.

In step S305, the demosaicing unit 107 executes demosaicing processing on the RAW data and generates color image data. In step S306, the resizing unit 108 executes resizing processing based on the magnification ratio decided in step S303 by the control unit 104 on the color image data. Then, in step S307 the mosaicing unit 109 executes mosaicing processing on the resized color image data to again convert the data into the RAW data format, and outputs this to the switching unit 110 as resized RAW data.

On the other hand, when not in the moving image recording mode, in S308, the control unit 104 switches the data path of the image processing unit 105 such that resizing processing is not applied to the RAW data. That is, the control unit 104 controls the switching unit 106 to output RAW data from the imaging unit 102 to the switching unit 110. Also, the control unit 104 controls the switching unit 110 to output RAW data from the switching unit 106 to the encoding unit 111.

In step S309, the encoding unit 111 encodes RAW data output from the image processing unit 105 (the switching unit 110) with a predetermined scheme, and outputs the encoded RAW data that was generated to the recording unit 112.

Figure 6A:
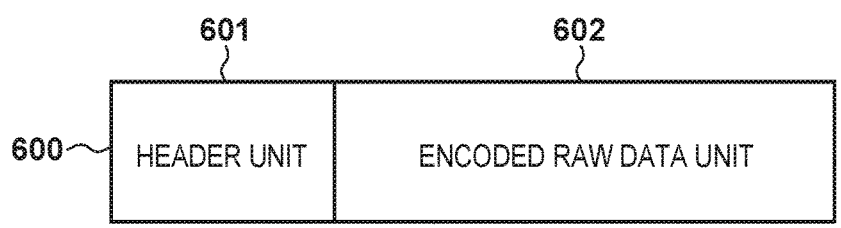
FIGS. 6A and 6B show an exemplary recording data format of an image processing apparatus according to an embodiment.

In step S310, the recording unit 112 records the RAW data to a recording medium as a data file of a predetermined format. An example of the recording format is shown in FIG. 6A. A header unit 601 includes an identification code or the like indicating the file format. The encoded RAW data generated by the encoding unit 111 can be stored in an encoded RAW data unit 602.

Note that in the case of the moving image recording mode, the control unit 104 controls each unit so as to obtain RAW data of a next frame, and repeatedly execute the processing of steps S305 to S310, until an instruction to pause or end moving image recording is input. In the case of the still image recording mode, the control unit 104, if there is continuous shooting, controls each unit so as to obtain RAW data of a next frame, and repeatedly execute the processing of steps S309 to S310. In the case of shooting a single frame, the control unit 104 ends processing.

Also, the processing of each step shown in FIG. 3 is automatically executed as a series of processes according to a recording instruction from the user. That is, in the present embodiment, it is not possible to adopt a configuration in which, according to a recording instruction from the user, processing up to the demosaicing processing of step S305 is executed once and recording to the recording medium is performed, and afterward, the user separately instructs resizing or demosaicing processing. Similarly, it is not possible to adopt a configuration in which, according to a recording instruction by the user, processing up to the resizing processing of step S306 is executed once and recording to the recording medium is performed, and afterward, the user separately instructs demosaicing processing, or executes demosaicing processing.

As described above, according to the present embodiment, resizing processing is performed after demosaicing processing of the RAW data, and the resized RAW data is generated by returning to the format of the RAW data. Therefore, there is no limitation of the magnification ratio of resizing processing that occurs when resizing by thinning RAW data. Also, there is an advantage that RAW data based on a high quality resized image can be obtained by resizing full-color data and then converting that data into a RAW data format. That is, even when the RAW image data has been resized with a magnification ratio other than one divided by an integer, it is possible to prevent the image quality of the resized image from markedly deteriorating.

Specifically, when the magnification ratio in the horizontal direction for resizing processing is set to N1/M1 (where N1 and M1 each are natural numbers, N1<M1, and M1 is not an integer multiple of N1), and the magnification ratio in the vertical direction is set to N2/M2 (where N2 and M2 each are natural numbers, N2<M2, and M2 is not an integer multiple of N2), it is possible to prevent the image quality of the resized image from markedly deteriorating. Also, at least one of the horizontal direction magnification ratio N1/M1 and the vertical direction magnification ratio N2/M2 can be set to a value other than one divided by an integer. In this case, M1 does not become an integer multiple of N1, or M2 does not become an integer multiple of N2.

Modified Examples

As shown in FIG. 1B, a configuration may also be adopted in which an image processing unit 105' is provided, and the switching units 106 and 110 in FIG. 1A are not provided. In this case, demosaicing processing, resizing processing, and mosaicing processing are always applied to the RAW data from the imaging unit 102. Therefore, in a case of not performing resizing of the RAW data, the control unit 104 sets the horizontal direction magnification ratio to 1 and the vertical direction magnification ratio to 1 in the resizing unit 108, and controls operation of the image processing unit 105' such that the RAW data is not substantially resized. In a case of performing resizing of the RAW data, the control unit 104 sets the magnification ratio decided in step S303 in the resizing unit 108.

Also, in the present embodiment, the number of pixels of a still image to be recorded in the still image recording mode and the number of pixels of a moving image to be recorded in the moving image recording mode are each determined values, but a configuration may also be adopted in which these values can be arbitrarily set by the user. That is, by operating the operation unit 103, the user arbitrarily sets the number of pixels of a still image to be recorded in the still image recording mode and the number of pixels of a moving image to be recorded in the moving image recording mode. When doing so, the number of pixels of the image sensor of the imaging unit 102 is used as the maximum number of pixels of still image data and moving image data to be recorded. The control unit 104 decides the magnification ratio in resizing processing by the resizing unit 108 based on the recording size and the shooting size that have been set by the user. The control unit 104 controls the resizing unit 108 so as to perform resizing processing according to the decided magnification ratio.

Also, in the present embodiment, the image data that was output from the image processing unit 105 is recorded by the recording unit 112, but a configuration may also be adopted in which the image data that was output from the image processing unit 105 is output to an external display apparatus or recording apparatus. In this case, the user can arbitrarily set the number of pixels of the image data to be output. The control unit 104 sets the magnification ratio for resizing processing in the resizing unit 108 according to the number of pixels of the output image that have been set by the user.

Second Embodiment

In the first embodiment, a configuration was described in which one type of RAW data is recorded. In the present embodiment, a configuration will be described in which two types of RAW data are recorded. In the present embodiment, RAW data to be newly generated and recorded is RAW data obtained by reducing the amount of data in order to reduce the load of processing (such as development processing) to be applied to the RAW data, and below, this is referred to as proxy RAW data or second RAW data. On the other hand, the RAW data recorded in the first embodiment is referred to as RAW data for recording or first RAW data. In the present embodiment, resizing processing is performed to generate second RAW data that has been reduced to a smaller size (a smaller number of pixels) than the corresponding first RAW data.

Figure 4:
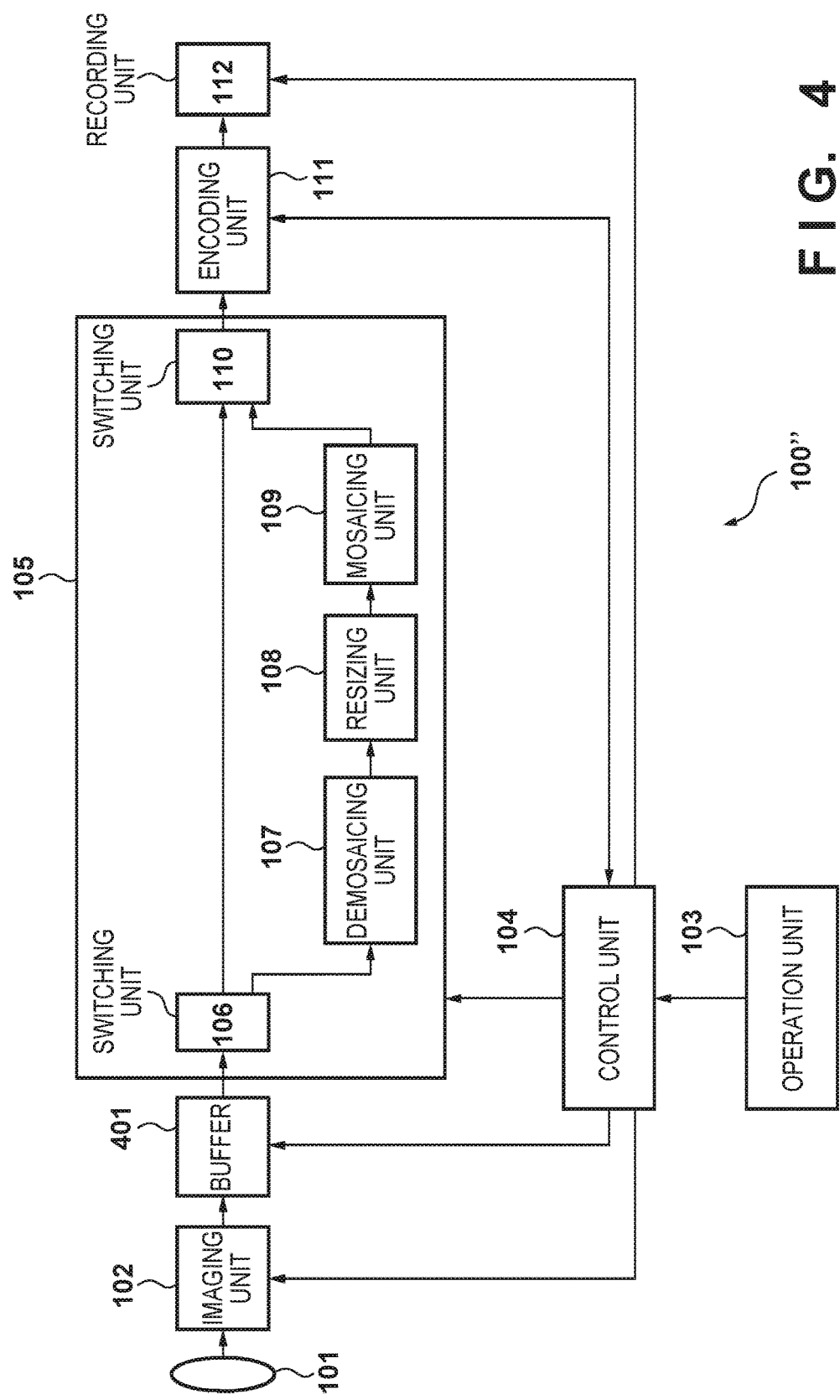
FIG. 4 is a block diagram showing an exemplary configuration of an image processing apparatus according to a second embodiment.

FIG. 4 is a block diagram showing an exemplary functional configuration of a digital video camera (DVC) 100" serving as an image processing apparatus according to a second embodiment of the present invention, and the same reference numerals are attached to the same constituent elements as in the DVC 100 of the first embodiment. The DVC 100" of the present embodiment differs from the configuration of the first embodiment in that a buffer memory (referred to below as simply a buffer) 401 configured to temporarily hold RAW data output by the imaging unit 102 is added. Note that the buffer 401 may also be provided in the image processing unit 105.

Also, the encoding unit 111 notifies the control unit 104 of the completion of encoding. The control unit 104 controls recording of the two types of RAW data using an encoding completion notification from the encoding unit 111. Also, the recording unit 112 associates the two types of RAW data, and specifically, records them in the same file.

In the present embodiment as well, as in the first embodiment, the number of pixels of RAW data for recording (the first RAW data) is 6K (5760 pixels horizontally×3840 pixels vertically) in the still image recording mode and 4K (3840 pixels horizontally×2160 pixels vertically) in the moving image recording mode. Also, it is assumed that the number of pixels of the proxy RAW data (the second RAW data) is 2K (1920 pixels horizontally×1080 pixels vertically) regardless of the recording mode.

Figure 5:
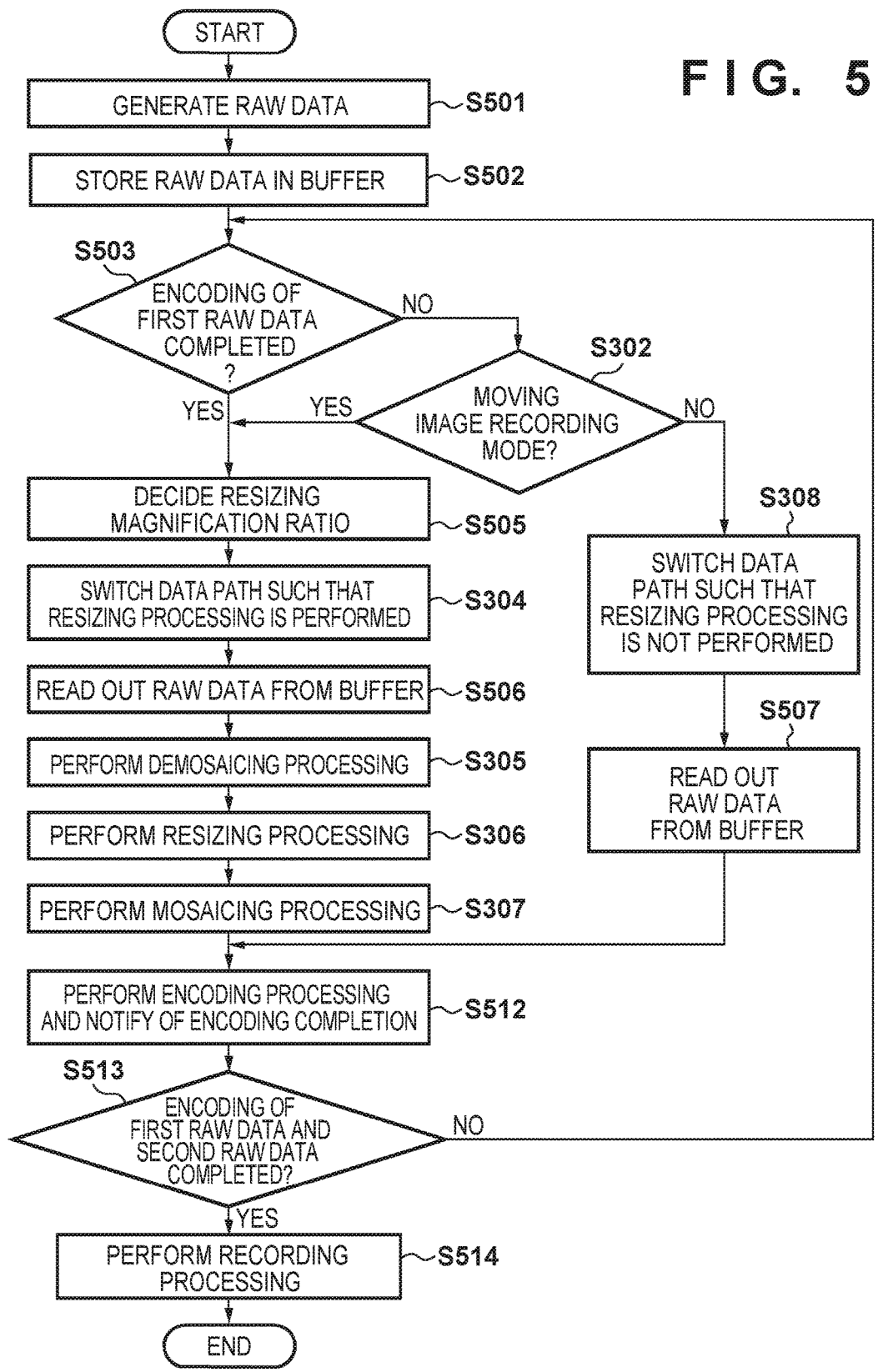
FIG. 5 is a flowchart related to recording processing of the image processing apparatus according to the second embodiment.

FIG. 5 is a flowchart related to operation of processing to record RAW data according to the DVC 100". In FIG. 5, the same reference numerals as in FIG. 3 are attached to steps in which similar processing as in the first embodiment is performed, and a description of those steps is omitted here.

First, in step S501, the control unit 104 controls the imaging unit 102, executes a shooting operation according to the recording mode, and obtains still image RAW data or moving image RAW data. Here as well, the control unit 104 may read out the RAW data from a recording medium through the recording unit 112, or may receive the RAW data from an external device.

In step S502, the control unit 104 stores the obtained RAW data in the buffer 401.

Alternatively, the control unit 104 may instruct the imaging unit 102 to write the generated RAW data to the buffer 401.

In step S503, the control unit 104 determines whether or not encoding of the first RAW data is completed, and if determined that the encoding of the first RAW data is completed, the control unit 104 advances processing to step S505, and if determined that encoding of the first RAW data is not completed, advances processing to step S504. In the present embodiment, the control unit 104 determines that the encoding of the first RAW data has been completed if an encoding completion notification has been received from the encoding unit 111 for the first RAW data.

In step S302, the control unit 104 determines whether or not the moving image recording mode has been set, and if the moving image recording mode has been set, the control unit 104 advances processing to step S505, and if the moving image recording mode has not been set (the still image recording mode has been set), the control unit 104 advances processing to step S308. Note that in the first embodiment, determination of the recording mode was a determination of the need to perform resizing processing. However, in the present embodiment, resizing processing is performed when generating the second RAW data even in the still image recording mode, so the reason for the recording mode determination is somewhat different.

In step S505, the control unit 104 decides the resizing magnification ratio. Basically, as in the first embodiment, it is sufficient to decide the resizing magnification ratio based on the shooting size and the recording size of RAW data in each recording mode. In the present embodiment, the control unit 104 decides the resizing magnification ratio as follows.
(1) Moving Image Recording Mode
  First RAW Data:
    Horizontal direction magnification ratio: 3840/5760=⅔
    Vertical direction magnification ratio: 2160/3840=9/16
  Second RAW Data:
    Horizontal direction magnification ratio: 1920/5760=9/32
    Vertical direction magnification ratio: 1080/3840=9/32
(2) Still Image Recording Mode
  Second RAW data:
    Horizontal direction magnification ratio: 1920/5760=9/32
    Vertical direction magnification ratio: 1080/3840=9/32

Note that in the present embodiment, it is assumed that the number of pixels of the proxy RAW data (the second RAW data) is 2K (1920 pixels horizontally×1080 pixels vertically) in both the moving image recording mode and the still image recording mode. However, a configuration may also be adopted in which the number of pixels of the proxy RAW data (the second RAW data) to be recorded in the moving image recording mode and the still image recording mode respectively can be arbitrarily set by the user.

In this case, if determined in step S503 that the encoding processing of the first RAW data has been completed for the RAW data that has been stored in the buffer 401, the control unit 104 discriminates whether the current recording mode is the moving image recording mode or the still image recording mode. Then, the control unit 104 sets a magnification ratio for resizing the second RAW data based on the recording number of pixels of the second RAW data corresponding to the current recording mode.

Because resizing processing is not performed for the first RAW data in the still image recording mode, the resizing magnification ratio is not decided. Note that in the present embodiment as well, when the configuration of the image processing unit 105 is changed as shown in FIG. 1B, as the magnification ratio for resizing processing of the first RAW data in still image recording mode, the control unit 104 can decide a horizontal direction magnification ratio of 1, and a vertical direction magnification ratio of 1.

In step S304, the control unit 104 switches the data path of the image processing unit 105 such that resizing processing is applied to the RAW data.

Note that it is sufficient that the decision of the resizing magnification ratio in step S505 and the switching of the data path in step S304 is executed once when the RAW data to which the recording mode or resizing processing is applied has changed.

In step S506, the control unit 104 reads out the RAW data from the buffer 401 and supplies the data to the image processing unit 105 (the switching unit 106).

In steps S305 to S307, in the same manner as in the first embodiment, demosaicing processing, resizing processing, and mosaicing processing are executed and then processing is advanced to step S512.

If encoding of the first RAW data has not been completed and the mode is not the moving image recording mode, in step S308 the control unit 104 switches the data path of the image processing unit 105 such that resizing processing is not applied to the RAW data.

In step S507, the control unit 104 reads out the RAW data from the buffer 401 and supplies the data to the image processing unit 105 (the switching unit 106), and then advances processing to step S309.

In step S512, the encoding unit 111 encodes the RAW data output from the image processing unit 105 (the switching unit 110) with a predetermined scheme, and outputs the encoded RAW data that was generated to the recording unit 112. Also, when encoding is completed, the encoding unit 111 notifies the control unit 104 of the completion of encoding. When the encoding of the first RAW data is completed, the encoding unit 111 notifies the control unit 104 that the encoding of the first RAW data has been completed, and when the encoding of the second RAW data is completed, the encoding unit 111 notifies the control unit 104 that encoding of all data has been completed. Note that the encoding unit 111 does not need to be aware of whether the encoded RAW data is the first RAW data or the second RAW data, and assuming that the first RAW data and the second RAW data are alternately supplied, it is possible to alternately output two types of completion notifications.

In step S513, the control unit 104 determines whether or not the encoding of the first RAW data and the corresponding second RAW data is completed, and if determined that the encoding has been completed, the control unit 104 advances processing to step S514, and if determined that the encoding has not been completed, the control unit 104 returns processing to step S503.

Figure 6B:
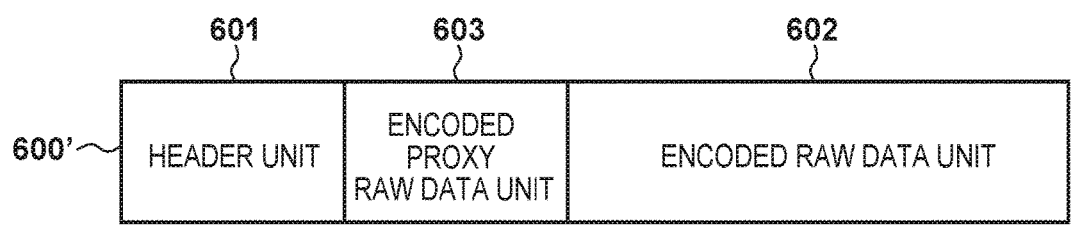

In step S514, the recording unit 112 performs recording to a recording medium with the first RAW data and the corresponding second RAW data associated with each other. For example, as shown in FIG. 6B, the recording unit 112 can store the first and second RAW data in the same data file. An encoding file 600' includes a header unit 601, an encoded proxy RAW data unit 603, and an encoded RAW data unit 602. The header unit 601 includes an identification code indicating a file format, an offset address of the head position of the encoded proxy RAW data unit 603 and the encoded RAW data unit 602, and the like. In the encoded proxy RAW data unit 603, the encoded second RAW data can be stored, and in the encoded RAW data unit 602, the encoded first RAW data can be stored.

For example, in the still image recording mode, the first RAW data is generated from the RAW data that is stored in the buffer 401. In this case, resizing processing is not performed, so the first RAW data is generated by a procedure of steps S503, S302, S308, and S507, and encoding is performed in step S512. When encoding of the first RAW data is completed, next the second RAW data is generated by a procedure of steps S503, S505, S506, and S305 to S307, and encoding is performed in step S512. When the encoding of the second RAW data is completed, in step S514 the first and second RAW data are recorded associated with each other, and then the processing for the RAW data that is stored in the buffer 401 ends.

In the case of the moving image recording mode, the first RAW data is generated from the RAW data that is stored in the buffer 401 by a procedure of steps S503, S505, S506, and S305 to S307, and encoding is performed in step S512. When the encoding of the first RAW data ends, the second RAW data is generated by again performing the same procedure, and encoding is performed in step S512. In the case of the moving image recording mode, the first and second RAW data are generated by the same procedure except that the magnification ratio of resizing processing in step S306 is different. When the encoding of the second RAW data is completed, in step S514 the first and second RAW data are recorded associated with each other, and then the processing for the RAW data that is stored in the buffer 401 ends.

Note that in the case of moving image recording mode, the color image data after demosaicing processing, which is subject to resizing processing in the generation of the first and second RAW data, is the same. Therefore, color image data that was generated by demosaicing processing when generating the first RAW data may be, for example, stored in the buffer 401 and used again when generating the second RAW data. By doing so, it is possible to omit the demosaicing processing when generating the second RAW data.

Note that in the case of the moving image recording mode, the control unit 104 controls each unit so as to repeatedly execute the processing of FIG. 5 also regarding a second frame and subsequent frames until an instruction to pause or end moving image recording is input. In the moving image recording mode, when encoding of the first RAW data using one frame of the RAW data that is stored in the buffer 401 is completed, encoding of the second RAW data using the same one frame of RAW data is performed. That is, the processing of the first RAW data and the processing of the second RAW data regarding one frame of the moving image data that is stored in the buffer 401 are alternately performed and recorded. Also, likewise for the second frame and subsequent frames, the processing of the first RAW data and the processing of the second RAW data on one frame of the moving image data that is stored in the buffer 401 are alternately performed and recorded. Therefore, in the moving image recording mode, switching of the data path (step S506) is not performed for the second frame and subsequent frames. Also, the resizing magnification ratio can be changed according to switching between processing of the first RAW data and processing of the second RAW data for one frame of the RAW data (step S505). On the other hand, in the case of the still image recording mode, the control unit 104, if there is continuous shooting, controls each unit so as to repeatedly execute the processing of FIG. 5 also regarding the next frame and subsequent frames. In the case of shooting a single frame, the control unit 104 ends processing.

As described above, according to the present embodiment as well, similar effects as the first embodiment can be obtained. Furthermore, by performing recording by RAW data addition with a light processing load, for example when editing appropriate development parameters with development software or the like, it is possible to quickly confirm results of editing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-092801, filed on May 2, 2016, which is hereby incorporated by reference herein in its entirety.

What is claimed is:

1. An image processing apparatus, comprising:
   an obtaining unit configured to obtain image data of a first data format, wherein the image data of the first data format comprises a plurality of pixel data each having a value of a single color component among a predetermined plurality of color components, and wherein the plurality of pixel data in the image data of the first data format being arranged according to a predetermined pixel arrangement;
   a first conversion unit configured to convert the image data of the first data format that was obtained by the obtaining unit to a second data format, and output the image data of the second data format, wherein the image data of the second data format comprises a plurality of pixel data each having values of the plurality of color components;
   a resizing unit configured to reduce the number of pixel data of the image data of the second data format that was output from the first conversion unit, and output reduced image data of the second data format; and
   a second conversion unit configured to convert the reduced image data of the second format to the first data format, and output the converted image data as the reduced image data of the first data format.

2. The image processing apparatus according to claim 1, further comprising:
   a recording unit configured to record the reduced image data of the first data format that was output from the second conversion unit to a recording medium; and
   a control unit configured to automatically execute as a series of processes, according to a recording instruction by a user, processing where the first conversion unit converts the image data of the first data format to the image data of the second data format, processing where the resizing unit reduces the number of pixel data comprised of the image data of the second data format, and processing where the second conversion unit converts the reduced image data of the second data format to the first data format.

3. The image processing apparatus according to claim 2, further comprising:
   a compression unit configured to compress the reduced image data of the first data format that was output from the second conversion unit,
   wherein the recording unit records the image data of the first data format that was output from the compression unit.

4. The image processing apparatus according to claim 1, wherein the resizing unit generates, from the same image data of the second data format that was output from the first conversion unit, a plurality of image data of the second data format each having a different number of pixels, and
   the second conversion unit converts each of the plurality of image data of the second format having the different numbers of pixels that were output from the resizing unit to reduced image data of the first data format.

5. The image processing apparatus according to claim 1, wherein the obtaining unit obtains the image data of the first data format using a single-plane type color image sensor.

6. The image processing apparatus according to claim 1, further comprising:
   a control unit configured to decide a magnification ratio for resizing processing in the resizing unit according to a user instruction, and control the resizing unit so as to reduce the number of pixels of the image data of the second data format output by the first conversion unit according to the decided magnification ratio.

7. The image processing apparatus according to claim 1, wherein the obtaining unit includes an image sensor configured to output the image data of the first data format.

8. The image processing apparatus according to claim 7, further comprising:
   a recording unit configured to record the reduced image data of the first data format that was output from the second conversion unit to a recording medium; and
   a decision unit configured to decide a magnification ratio based on the number of pixels of image data output from the image sensor, and the number of pixels of image data to be recorded by the recording unit,
   wherein the resizing unit reduces the number of pixels of the image data of the second data format output from the first conversion unit based on the magnification ratio.

9. The image processing apparatus according to claim 8, wherein the number of pixels of image data to be recorded by the recording unit is set according to an instruction from a user.

10. The image processing apparatus according to claim 8, wherein the image processing apparatus has a first recording mode where the recording unit records the image data of the first data format that was output from the image sensor, and a second recording mode where the recording unit records the reduced image data of the first data format that was output from the second conversion unit.

11. The image processing apparatus according to claim 10, further comprising:
    a control unit configured to perform control such that processing where the first conversion unit converts the image data that was output from the image sensor to the image data of the second data format, processing to reduce the number of pixels with the resizing unit, and processing where the second conversion unit converts the image data of the second data format to the image data of the first data format, are not performed in the first recording mode.

12. The image processing apparatus according to claim 10, further comprising:
- a control unit configured to decide a magnification ratio for resizing processing in the resizing unit according to a user instruction, and control the resizing unit so as to reduce the number of pixels of the image data of the second data format output by the first conversion unit according to the decided magnification ratio,
- wherein the control unit, in the first recording mode, performs control so as to not reduce the number of pixels with the resizing unit for the image data that was output from the image sensor.

13. The image processing apparatus according to claim 10,
- wherein the first recording mode is a still image recording mode, and the second recording mode is a moving image recording mode.

14. The image processing apparatus according to claim 7, wherein the number of pixels of the image sensor is at least 6K.

15. An image processing apparatus comprising:
- an imaging unit configured to obtain image data of a first data format, wherein the image data of the first data format comprises a plurality of pixel data each having a value of a single color component among a predetermined plurality of color components, and wherein the plurality of pixel data in the image data of the first data format being arranged according to a predetermined pixel arrangement;
- a first conversion unit configured to perform demosaicing processing on the image data of the first data format that was obtained by the imaging unit, and output image data of a second data format, wherein in the image data of the second data format comprises a plurality of pixel data each having values of the plurality of color components;
- a resizing unit configured to perform resizing processing to reduce the number of pixels of the image data of the second data format that was output from the first conversion unit, and output reduced image data of the second data format,
- the resizing unit performing the resizing processing with a magnification ratio of N1/M1 (where N1 and M1 each are natural numbers, and N1<M1) in the horizontal direction, and N2/M2 (where N2 and M2 each are natural numbers, and N2<M2) in the vertical direction, and
- M1 is not an integer multiple of N1, or M2 is not an integer multiple of N2;
- a second conversion unit configured to perform mosaicing processing on the reduced image data of the second format that was output from the resizing unit, and output reduced image data of the first data format;
- a recording unit configured to record the reduced image data of the first data format that was output from the second conversion unit; and
- a control unit configured to perform control such that the demosaicing processing by the first conversion unit, the resizing processing by the resizing unit, and the mosaicing processing by the second conversion unit are automatically executed as a series of processes according to a recording instruction by a user.

16. The image processing apparatus according to claim 15,
- wherein the imaging unit obtains moving image data of the first data format.

17. A control method of an image processing apparatus, comprising:
- obtaining image data of a first data format, wherein the image data comprises a plurality of pixel data each having a value of a single color component among a predetermined plurality of color components, and wherein the plurality of pixel data are arranged according to a predetermined pixel arrangement;
- performing first conversion of obtaining image data of the second data format by converting the image data of the first data format that was obtained in the obtaining to a second data format, wherein the image data of the second format comprises a plurality of pixel data each having values of the plurality of color components;
- resizing of the image data of the second format by reducing a number of pixels of the image data of the second data format that was obtained in the first conversion to obtain reduced image data of the second data format; and
- performing second conversion of converting the reduced image data of the second format that was obtained in the resizing to the first data format, and obtaining reduced image data of the first data format.

18. A non-transitory computer-readable medium containing a program that causes at least one processor of an image processing apparatus to function as:
- an obtaining unit configured to obtain image data of a first data format, wherein the image data of the first data format comprises a plurality of pixel data each having a value of a single color component among a predetermined plurality of color components, and wherein the plurality of pixel data in the image data of the first data format being arranged according to a predetermined pixel arrangement;
- a first conversion unit configured to convert the image data of the first data format that was obtained by the obtaining unit to a second data format, and output the image data of the second data format, wherein the image data of the second data format comprises a plurality of pixel data each having values of the plurality of color components;
- a resizing unit configured to reduce the number of pixel data of the image data of the second data format that was output from the first conversion unit, and output reduced image data of the second data format; and
- a second conversion unit configured to convert the reduced image data of the second format to the first data format, and output the converted image data as the reduced image data of the first data format.

* * * * *